May 12, 1936.   W. WILKINSON ET AL   2,040,116
METHOD FOR THE SEPARATION AND RECOVERY OF KRYPTON
AND XENON FROM GASEOUS MIXTURES CONTAINING THEM
Filed June 11, 1935   2 Sheets-Sheet 1

INVENTOR
Walter Wilkinson and
Joseph L. Schlitt
BY
Pennie Davis Marvin & Edmonds
ATTORNEYS.

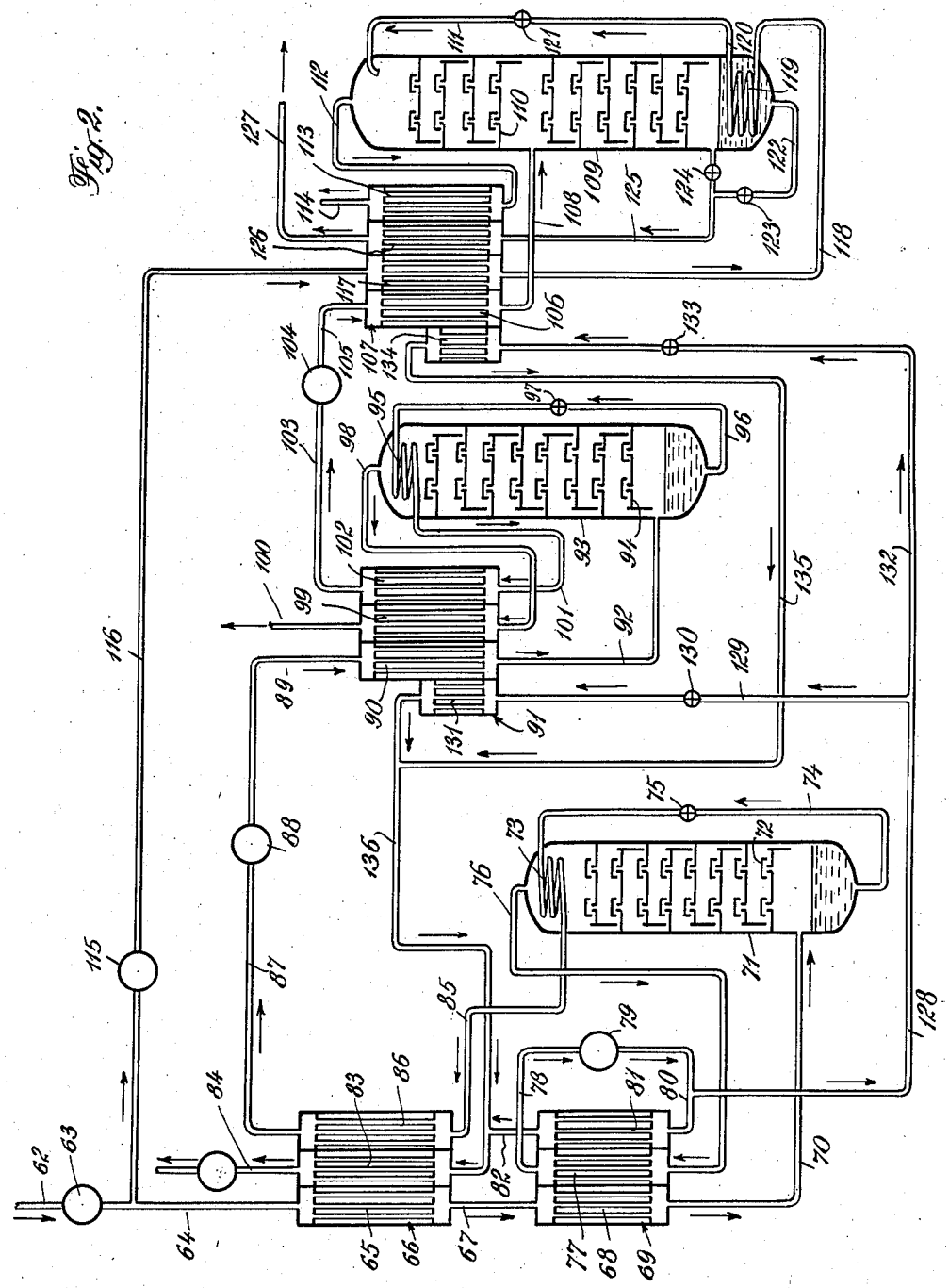

Patented May 12, 1936

2,040,116

UNITED STATES PATENT OFFICE 2,040,116

METHOD FOR THE SEPARATION AND RECOVERY OF KRYPTON AND XENON FROM GASEOUS MIXTURES CONTAINING THEM

Walter Wilkinson, Rye, N. Y., and Joseph L. Schlitt, Darien, Conn., assignors to Air Reduction Company, Incorporated, New York, N. Y., a corporation of New York Application June 11, 1935, Serial No. 26,000

5 Claims. (Cl. 62—175.5)

This invention relates to a process for separating the rare gases krypton and xenon from gaseous mixtures containing them such as, for example, atmospheric air or the residual by-product of air resulting from the separation of oxygen or nitrogen or both from atmospheric air.

The method forming the subject matter of the present application has for its object the economical production of krypton and xenon from gaseous mixtures containing them and does not attempt to separate oxygen or nitrogen in purities commercial at the present time.

This method is characterized by the important feature that of the entering gaseous mixture containing krypton and xenon, only a small fraction (0.1) is condensed to the liquid state. This small condensed portion carries, as a result of the method of condensation, all the krypton-xenon contained in the original mixture. The major uncondensed portion after the preliminary partial condensation just described, passes outward through suitable exchangers to recover the cold contained therein and thereafter is rejected.

The condensed portion, i. e., the krypton-xenon concentrate from this preliminary condensation is further treated in suitable apparatus in either the gaseous or liquid state and is again separated into two portions, first a liquid portion carrying substantially all of the krypton-xenon of the original mixture and a residual uncondensed vapor portion, the latter as before being rejected after its cold is recovered by means of suitable exchangers.

This second condensation portion is again only a small fraction (0.1–0.2) of the total treated fluid resulting from the first condensation and the uncondensed portion is again rejected while the liquid portion either before or after vaporization is still further treated in a relatively small apparatus which completes the separation, that is, which gives as its product a residual uncondensed portion consisting of oxygen and nitrogen impurities and a lower or liquid product constituting the krypton-xenon product of the method.

As a result of the fact that practically all vapors liquefied in this method have compositions not greatly different from that of the liquid which condenses them, it follows that the pressure necessary in any of the fluids that are condensed in order to condense them is very much less than the pressure required in prior air separation methods, for example, where air must be condensed till the uncondensed vapor residue has a composition approximating that of pure nitrogen, by thermal contact with a body of liquid oxygen the latter under one atmosphere of pressure. The low pressure necessary in the present method for producing these necessary condensations, results in a further economy in power required, inasmuch as all compressions may be accomplished by means of machines of the turbo type. Furthermore, this low pressure throughout the system allows the exchange of heat between cold and warm fluids in the exchanger system to be more reversible from a thermodynamic standpoint and thus the efficiency of the whole system is very materially increased.

Further objects and advantages of the invention will be better understood by reference to the accompanying diagrammatic drawings which illustrate types of apparatus suitable for the practice of the invention. In the drawings, Fig. 1 shows a practicable apparatus; and Fig. 2 illustrates a slightly modified arrangement.

The method, as conducted in apparatus shown in Fig. 1, employs for the first two concentrations described above, a method of rectification wherein a reflux liquid obtained from an external source is delivered to the top of a column of rectification trays and meets therein the vapor ascending from below, the liquid as it descends becoming concentrated in krypton and xenon while the vapor as it ascends becomes impoverished in these two constituents. Referring to Fig. 1, the entering mixture enters the system through pipe 5 and is compressed to a required pressure in compressor 6 whence the major portion passes through a pipe 7 and through a compartment 8 of an exchanger 9 wherein it is cooled by outgoing products. From exchanger 9 it passes through pipe 10 to exchanger 11 traversing the compartment 12 and leaving the exchanger 11 through pipe 13 by means of which it enters the first rectifier concentrator 14.

The vapor ascends the rectifier 14 and contacts directly with liquid descending therein derived from an external source, as hereinafter described, and delivered to the top level of rectifier 14. As the result of this counter-current contact between liquid and vapor, the krypton-xenon of the entering mixture is all concentrated in the liquid collecting at the bottom 15 of rectifier 14, while the residual vapor, leaving the top of rectifier 14 and practically freed from krypton and xenon, passes outward through pipe 16 and enters compartment 17 of exchanger 11. The residual vapor passes thence through pipe 18 to the turbo-expander 19, the exhaust of which is divided into two parts. The main portion passing through pipe 20 enters compartment 21 of exchanger 11, while the minor portion passing through pipe 22 enters compartment 23 of exchanger 24 and thence through pipe 25 to join the other portion of the exhaust in pipe 26 which delivers the total to compartment 27 of exchanger 9. Thence it passes outward to the atmosphere, it may be, through vacuum pump 28.

The second portion of the incoming mixture leaving compressor 6 is conducted through a pipe 29 to the booster compressor 30. Thence the major portion passes through pipe 31 to compartment 32 of exchanger 33 wherein it is cooled down by thermal contact with a suitable outgoing product as hereinafter described. From exchanger 33 it passes through pipe 34 to the coil 35 located at the bottom of the evaporator-rectifier 36 wherein it is liquefied and passes thence through pipe 37 and pressure reducing valve 38 to the top level of rectifier 14 consituting the top liquid reflux for that rectifier.

The liquid product of rectifier 14 collecting at the bottom 15 leaves the liquid pool through pipe 39 and enters the bottom of the rectifier-evaporator 36, wherein its equivalent is evaporated from the liquid pool at the bottom of rectifier 36 as above described. The vapor from this evaporation passing upward in rectifier 36 comes in contact with a liquid reflux delivered to the top level 40 of that rectifier and the vapor product leaves rectifier 36 through pipe 41 entering compartment 42 of exchanger 33 and thence passes to the outside where it is rejected.

The lower liquid product of evaporator-rectifier 36 leaves the bottom through pipe 43 and enters an intermediate level of the double rectifier 44 wherein it cascades over trays and collects in a liquid pool at the bottom. A portion of the air leaving booster compressor 30 is diverted through pipe 45 to the small booster compressor 46 wherein it is compressed to a pressure suitable for condensation in a coil at the bottom of rectifier 44. This triple compressed air leaves compressor 46 through a pipe 47 and enters compartment 48 of the exchanger 49 and thence through compartment 50 of exchanger 24 and thence through a pipe 51 through evaporating coil 52 at the bottom of rectifier 44. After being liquefied by thermal contact with the liquid collecting at the bottom of rectifier 44, it is conducted through a pipe 53 and pressure reducing valve 54 to serve as top reflux for both rectifiers 36 and 44, that portion passing to rectifier 44 traversing valve 55 whereas that portion which refluxes rectifier 36 passes through valve 40'.

The upper uncondensed product of rectifier 44, substantially free from krypton and xenon, passes outward through pipe 56 to compartment 57 of exchanger 49 and is then rejected. The lower end or krypton-xenon product of rectifier 44 is abstracted in either the liquid or in the vapor state or both by means of valves 58 and 59 respectively, joining together in pipe 60 and then entering compartment 61 of exchanger 49 where its temperature is reduced to that of the surrounding atmosphere.

From the foregoing description, it is clear that this process is a very efficient one for the seperation of krypton and xenon from mixtures containing them without separation in the pure state of any other constituents. The outstanding feature is that only a relatively small portion is liquefied and furthermore since the compositions of the vapor to be condensed and the liquid by means of which it is condensed are not greatly different, the pressure requirement for all condensations is relatively very small and easily within the pressure range for machines of the turbo type. Furthermore, by the judicious use of a turbo-vacuum compressor 28 the expansion ratio of turbo-expander 19 may be easily and efficiently made sufficient for all refrigeration needs of the system. Rectifier 44 in which the final separation is completed is a very small piece of apparatus relative to rectifier 36 which in turn is very small relative to the first rectifier 14.

Fig. 2 illustrates an alternative arrangement of apparatus in which the first two krypton-xenon concentrations are accomplished by means of successive condensations out of a portion of the incoming mixture. In this alternative arrangement, the minor fraction (0.1) of the original mixture which is condensed is evaporated after its pressure has been lowered by pressure reducing valves, by acting as a condensing fluid in the first concentration. It is then restored to atmospheric temperature and again compressed, after which it passes through suitable exchangers and enters in the vapor state the second concentrator or rectifier, and in turn is divided into two portions, (1) a lower liquid portion and (2) an upper uncondensed vapor portion. The liquid portion, that is, the krypton-xenon concentrate from this second concentrator after passing a pressure reducing valve, acts as condensing fluid at the top of the second concentrator in a manner precisely similar to that employed by the liquid obtained at the bottom of the first concentrator. After being evaporated in this manner, its temperature is restored to atmospheric and its pressure is again raised by a small compressor after which, passing through a suitable exchanger, it enters an intermediate level of the final rectifier wherein it is separated into an upper end vapor product consisting of oxygen and nitrogen and a lower liquid product constituting the krypton-xenon product.

Referring to Fig. 2 of the drawings, the gaseous mixture is introduced through a pipe 62 and is compressed to the desired pressure in a suitable compressor or blower 63. It passes thence through a pipe 64 to a compartment 65 of the exchanger 66 and thence through a pipe 67 to a compartment 68 of the changer 69. A pipe 70 delivers the incoming gaseous mixture to the rectifier 71, wherein it passes upwardly through the usual trays 72 and is partially liquefied by contact with the liquid flowing downwardly produced at the upper end of the rectifier by contact with the coil 73. To this coil the liquid concentrate from the bottom of the rectifier is delivered through a pipe 74 and expansion valve 75. The unliquefied residue or effluent escapes through a pipe 76, passes through a compartment 77 of the exchanger 69 and thence through a pipe 78 to the turbo-expander 79. A pipe 80 delivers the effluent cooled by expansion to the chamber 81 of the exchanger 69. Thence it passes through a pipe 82 to the chamber 83 of the exchanger 66 and escapes through a pipe 84.

The vapor from the coil 73 is delivered through a pipe 85 to a chamber 86 of the exchanger 66 and passes through a pipe 87 to a booster-compressor 88, preferably of the turbo type. The vapor is delivered through a pipe 89 to a compartment 90 of an exchanger 91, and thence through a pipe 92 to the bottom of a rectifier 93. The vapor passes up through the usual trays 94 and is partially liquefied by contact with a coil 95. The coil is supplied with liquid from the bottom of the rectifier through a pipe 96 and expansion valve 97. The uncondensed residue or effluent escapes through a pipe 98 to a compartment 99 of the exchanger 91, and thence through the outlet pipe 100.

The vapor formed in the coil 95 is delivered through the pipe 101 to the chamber 102 of the exchanger 91, and thence through a pipe 103 to a booster-compressor 104 preferably of the turbo type. After compression, the vapor passes through the pipe 105 to a chamber 106 of an exchanger 107 and thence through a pipe 108 to an intermediate level of a rectifier 109. The vapor rises through the usual trays 110 and is subjected to the washing action of a liquid delivered to the top of the column through a pipe 111. The effluent, consisting of nitrogen, argon and oxygen, escapes through a pipe 112 to a compartment 113 of the exchanger 107, and thence through the outlet pipe 114.

The liquid supplied through the pipe 111 results from liquefaction of a portion of the incoming mixture delivered by a booster-compressor 115, preferably of the turbo type, through a pipe 116 and compartment 117 of the exchanger 107 whence it passes through a pipe 118 to a coil 119 disposed in the bottom of the rectifier 109. The liquid formed in the coil is delivered through a pipe 120 and pressure reducing valve 121 to the pipe 111.

In liquefying the gaseous mixture in the coil 119, the krypton-xenon concentrate which collects as a liquid in the bottom of the rectifier 109 is vaporized, a portion of the vapor passing upwardly and being recondensed in the rectifier. The liquid is withdrawn through a pipe 122 and pressure reducing valve 123, and it is joined by a portion of the vapor withdrawn through the pressure reducing valve 124. A pipe 125 delivers the krypton-xenon concentrate to a compartment 126 of the exchanger 107, whence it escapes through the outlet pipe 127 as the product of the separation.

To assist in cooling the exchangers 91 and 107, a portion of the expanded effluent may be diverted from the pipe 80 through a pipe 128. A pipe 129, including valve 130, delivers the effluent to the compartment 131 of the exchanger 91. Similarly a pipe 132 provided with a valve 133 delivers a portion of the effluent to the compartment 134 of the exchanger 107. A pipe 135 delivers the effluent to a pipe 136 connected to the compartment 131 which is connected to the compartment 83 of the exchanger 66.

The procedure as described is substantially that described in connection with Fig. 1 except in respect to the utilization of the liquid collected at the bottom of each of the first two rectifiers as a cooling agent, to liquefy vapors at the top of each of the respective rectifiers. As in the preceding embodiment of the invention, the desired result is accomplished by successive concentrations with the elimination of constituents other than krypton and xenon constituting the product of the operation.

Various changes may be made in the form and arrangement of the apparatus as well as in the procedure outlined without departing from the invention or sacrificing any of the advantages thereof.

We claim:

1. The method of separating and recovering krypton and xenon from air which comprises subjecting a portion of the incoming air to liquefaction and rectification in a plurality of steps, rejecting in each step the unliquefied portion of the air treated and producing thereby a concentrate rich in krypton and xenon, and finally rectifying the concentrate with a further portion of the air, thereby enriching the concentrate in krypton and xenon.

2. The method of separating and recovering krypton and xenon from air which comprises subjecting a portion of the incoming air to liquefaction and rectification in a plurality of steps, rejecting in each step the unliquefied portion of the air treated and producing thereby a concentrate rich in krypton and xenon, and finally rectifying the concentrate with a further portion of the air, thereby enriching the concentrate in krypton and xenon, and rejecting the upper effluent from the final rectification.

3. The method of separating and recovering krypton and xenon from air which comprises subjecting a portion of the air to liquefaction and rectification to produce a liquid rich in krypton and xenon, vaporizing the liquid product and subjecting it to a second liquefaction and rectification, rejecting in each step the upper effluent from the rectification and producing thereby a concentrate rich in krypton and xenon and finally rectifying the concentrate with a further portion of air, thereby enriching the concentrate in krypton and xenon.

4. The method of separating and recovering krypton and xenon from air which comprises subjecting a portion of the air to liquefaction and rectification to produce a liquid rich in krypton and xenon, vaporizing the liquid product and subjecting it to a second liquefaction and rectification and producing thereby a concentrate rich in krypton and xenon and finally rectifying the concentrate with a further portion of air, thereby enriching the concentrate in krypton and xenon, and rejecting the effluent from the final rectification.

5. The method of separating and recovering krypton and xenon from air which comprises liquefying selectively a portion of the air to be treated to secure a liquid enriched in krypton and xenon, evaporating the liquid to effect by heat exchange the selective liquefaction of the incoming air, recompressing and cooling the vapor from the enriched liquid, subjecting the vapor to further partial liquefaction, rectifying the liquid products with the addition of a relatively large volume of unseparated air, and withdrawing the liquid product of the rectification consisting essentially of krypton and xenon.

WALTER WILKINSON.
JOSEPH L. SCHLITT.